United States Patent
Diehl et al.

(10) Patent No.: US 9,487,169 B2
(45) Date of Patent: Nov. 8, 2016

(54) FRONT-END MODULE

(71) Applicant: Magna Exteriors GmbH, Sailauf (DE)

(72) Inventors: Peter Diehl, Kirchheim (DE); Robert Mohr, Weinstadt (DE)

(73) Assignee: MAGNA Exteriors GmbH, Sailauf (DE)

(*) Notice: Subject to any disclaimer, the term of this patent is extended or adjusted under 35 U.S.C. 154(b) by 0 days.

(21) Appl. No.: 14/807,907

(22) Filed: Jul. 24, 2015

(65) Prior Publication Data
US 2016/0023623 A1  Jan. 28, 2016

(30) Foreign Application Priority Data
Jul. 24, 2014 (DE) .................. 10 2014 214 561

(51) Int. Cl.
| | | |
|---|---|---|
| B60R 19/34 | (2006.01) | |
| B62D 25/08 | (2006.01) | |
| B62D 27/06 | (2006.01) | |
| B62D 21/15 | (2006.01) | |
| B60R 19/24 | (2006.01) | |
| B60R 19/26 | (2006.01) | |

(52) U.S. Cl.
CPC ............. *B60R 19/34* (2013.01); *B62D 21/152* (2013.01); *B62D 25/085* (2013.01); *B62D 27/06* (2013.01); *B60R 2019/247* (2013.01); *B60R 2019/262* (2013.01)

(58) Field of Classification Search
CPC .. B62D 27/06; B62D 25/085; B62D 21/152; B60R 19/34; B60R 2019/262; B60R 2019/247

USPC ...................... 293/133; 296/193.09
See application file for complete search history.

(56) References Cited

U.S. PATENT DOCUMENTS

| | | | | |
|---|---|---|---|---|
| 5,672,405 A | * | 9/1997 | Plank, Jr. ........... | B29C 45/14311 264/273 |
| 8,235,433 B2 | * | 8/2012 | Gonin .................. | B60R 19/12 293/120 |
| 8,562,042 B2 | * | 10/2013 | Gonin .................. | B60R 19/12 293/132 |

FOREIGN PATENT DOCUMENTS

| | | |
|---|---|---|
| DE | 19603957 A1 | 8/1997 |
| DE | 60213411 T2 | 2/2007 |
| DE | 102010022738 A1 | 12/2011 |
| DE | 102010048029 A1 | 4/2012 |
| DE | 102012019092 A1 | 3/2013 |
| EP | 1251038 A2 | 10/2002 |
| EP | 2284066 A2 | 2/2011 |
| FR | 2879553 A1 | 6/2006 |
| FR | 2935934 A1 | 3/2010 |
| IT | EP 2949518 A1 * 12/2015 ............. B60R 19/03 |  |

* cited by examiner

*Primary Examiner* — Pinel Romain
(74) *Attorney, Agent, or Firm* — Jordan IP Law, LLC; Todd A. Vaughn

(57) ABSTRACT

A front-end module having a cross-member with crash boxes attached thereto, and a mounting support arranged spaced apart therefrom and above the cross-member. The mounting support is attached by support elements to the cross-member or to the crash boxes, and the support elements are connected by clip connections to the mounting support.

18 Claims, 2 Drawing Sheets

FRONT-END MODULE

CROSS-REFERENCE TO RELATED APPLICATIONS

The present application claims priority 35 U.S.C. §119 to German Patent Publication No. DE 102014214561.9 (filed on Jul. 24, 2014), which is hereby incorporated by reference in its entirety.

TECHNICAL FIELD

Embodiments relate to a front-end module at least comprising a cross-member with crash boxes attached thereto and a mounting support arranged spaced apart therefrom and above said cross-member, wherein the mounting support is attached by way of support elements to the cross-member or the crash boxes.

BACKGROUND

Front-end modules for motor vehicles are known. A front-end module on a vehicle generally forms the front part of the body framework. The front-end module has upper and lower elements, which in each case are arranged horizontally on the upper end and the lower end, and at least one vertical element which vertically connects both the upper and the lower elements.

Thus a front-end module for a motor vehicle comprising a frame-shaped mounting support, a bumper cross-member arranged approximately in the central vertical region of the mounting support and connected thereto, an outer skin element and at least one impact absorption element between the mounting support and the outer skin element is disclosed in DE 100 42 037 A1.

A front-end module for a vehicle body having an additional element, which extends upwardly from the bumper cross-member, is disclosed in DE 10237454B3. (The directional information "upwardly" refers, as in the directional information used hereinafter, to the installed position of the front-end module in a motor vehicle.) The bumper cover is attached to the additional element.

FR 2935934 A1 discloses a mounting support to which support elements are attached, said support elements being supported on a bumper support. Said support elements are fixedly connected to the mounting support. A connecting element serves for this purpose, said connecting element being pushed through bores at the top of the support element and through bores on the mounting support.

A crash box is fastened to a mounting support in DE 102012019092 A1. The fastening takes place by way of retaining devices which are configured as T-pieces or bayonet closures.

DE 102012021746 A1 discloses a mounting support for a front-end module in a modular system which is designed for a vertical adaptation of the mounting support relative to the vehicle cross-member. In this case, support elements having different overall heights are used and connected to the mounting support.

SUMMARY

Proceeding from such a modular principle for the adaptation of the overall heights of the mounting support above the cross-member, the object of embodiments is to produce a connection between different support elements and the mounting support which is simple to mount.

The object is achieved by a front-end module at least comprising a cross-member with crash boxes attached thereto and a mounting support arranged spaced apart therefrom and above said cross-member, wherein the mounting support is attached by way of support elements to the cross-member or to the crash boxes and the support elements having different overall heights are connected by clip connections to the mounting support.

In accordance with embodiments, a front-end module for a vehicle may include at least one of the following: a cross-member with crash boxes attached thereto; a mounting support arranged spaced apart therefrom and above said cross-member; and support elements to attach the mounting support to the cross-member or the crash boxes, wherein the support elements have different overall heights; and clip connections to connect the support elements to the mounting support.

In accordance with embodiments, a front-end module for a vehicle may include at least one of the following: a cross-member having crash boxes; a mounting support arranged spaced apart therefrom and above said cross-member, the mounting support including a mounting support body, an upper part and an upper flange; and support elements to attach the mounting support to the crash boxes, wherein the support elements are latched via a clip connection to the upper part, and includes an upper support which is supported on the upper part and a lower support which is supported on the crash boxes.

The support elements may be easily exchanged with one another by way of the clip connections between the mounting support and the support elements. Support elements having different heights may be used in order to adapt to the respective overall heights of the vehicle. Different types of support elements may also be used. The mounting is simplified by the clip connections.

In an advantageous embodiment of the front-end module the mounting support is made up of an upper mounting support flange and an upper mounting support part. Advantageously, the upper flange comprises metal.

It is also advantageous if the upper part comprises plastics. This hybrid structure of the mounting support permits a flexible production of the support, whilst optimizing the weight and the stability.

Advantageously, the mounting support is also produced entirely from plastics or from an assembly consisting of an organometallic sheet with metal or lightweight metal.

The mounting support may also be optimally produced entirely from plastics for the respective requirements, or from an organometallic sheet which is optionally reinforced with metal or lightweight metal components. The mounting support has to be at least partially sufficiently flexible for the clip connections so that a clip connection is maintained.

It is advantageous, therefore, that the upper mounting support part or the mounting support comprises a clip or recess for receiving a mating part on the support element in the form of an edge.

It is also advantageous if the upper mounting support part or the mounting support comprises a bearing lug for bearing a mating part on the support element in the form of a clip hook.

It is advantageous here if the support element is able to be clipped or received into the upper mounting support part or the mounting support in the y-direction in order to permit in this manner a simple mounting of the support elements.

In order to permit the clipping in a simple manner, the support element and the upper part or the mounting support are constructed so that the clip connection faces in the vehicle longitudinal direction.

DRAWINGS

Embodiments are described hereinafter by way of example with reference to the accompanying drawings.

Figures 4, 4A, 4B:
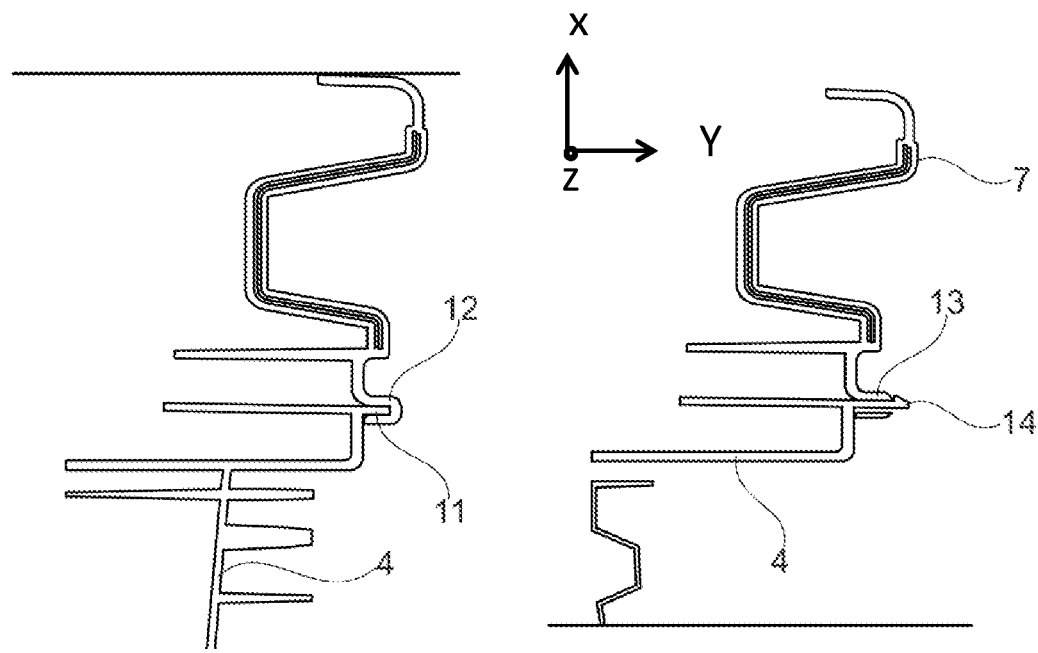

FIGS. 4(a) and 4(b) illustrate sectional views of the front-end module, in accordance with embodiments.

DESCRIPTION

Figure 1:
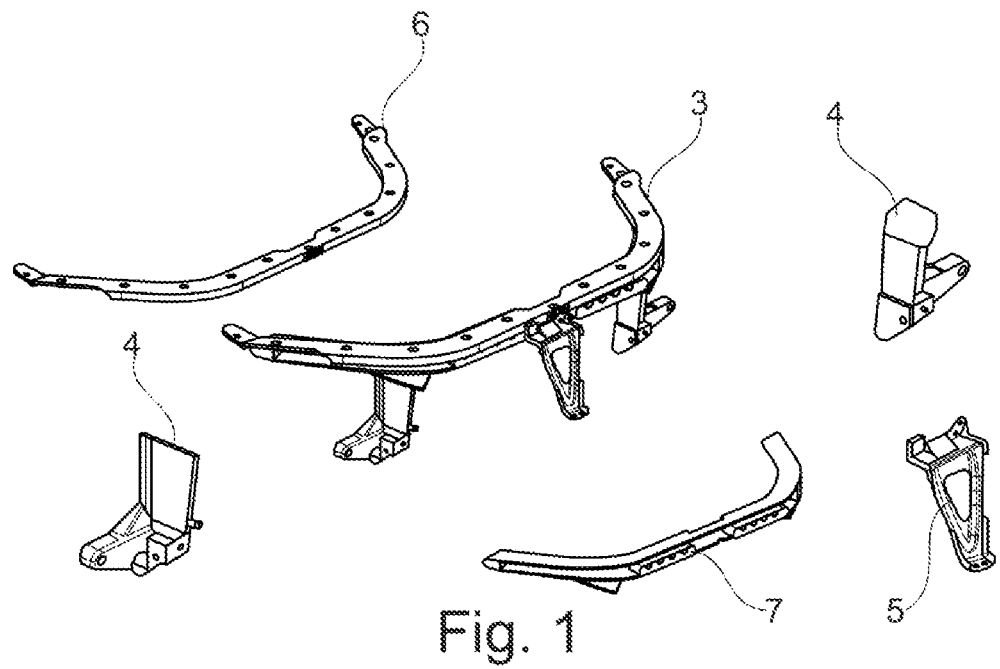
FIG. 1 illustrates an exploded view of a front-end module, in accordance with embodiments.
Figure 2:
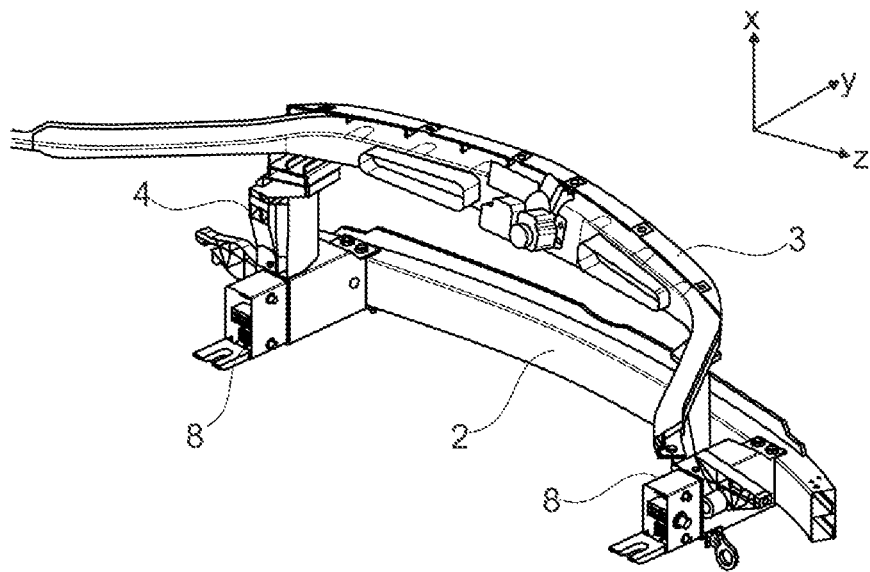
FIG. 2 illustrates an assembled version of the front-end module of FIG. 1.

FIG. 1 illustrates in an exploded view how the assembly of a front module of FIG. 2 is constructed. Serving as a basis is a cross-member 2 to which crash boxes 8 are attached to the left and to the right. At the top in the x-direction a mounting support 3 is positioned and fastened by support elements 4 on the crash boxes 8.

The cross-member 2 is a component made of metal, and which may be produced in any manner known to the person skilled in the art. Fixedly connected to the cross-member 2 are crash boxes 8 which may also be produced from very different materials and in very different embodiments. In the example of FIG. 2, the crash boxes 8 are connected via screw connections to the cross-member 2. The mounting support 3 is produced in different ways. In the example of FIG. 1, the mounting support 3 includes a mounting support body, an upper mounting support flange 6 composed of metal, and an upper mounting support part 7 composed of plastic. A lock support 5 for the engine bonnet is also able to be identified.

In accordance with embodiments, the support elements 4 are latched via clip connections to the upper mounting support part 7. The upper mounting support flange 6 is produced in one piece from metal, but it is also possible to construct a three-part structure with a central part and two side parts. In a further advantageous embodiment, the upper mounting support flange 6 is constructed from an assembly of an organometallic sheet in the central part with aluminum side parts to the left and right thereof. Here, the assembly of the upper mounting support flange 6 is connected in each case to an upper mounting support part 7.

In accordance with embodiments, the mounting support 3 is produced entirely from plastics, wherein a closed cross-section is produced using different welding methods. The support elements 4 are clipped in each case into the plastics.

Figure 3:
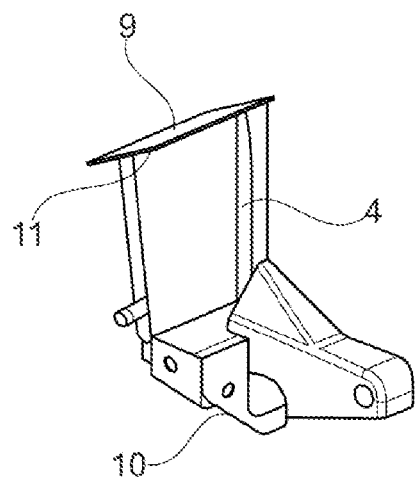
FIG. 3 illustrates a support element of the front-end module, in accordance with embodiments.

As illustrated in FIG. 3, the support element 4 is designed to be approximately L-shaped. The support element 4 in this case has an upper support element section 9 so as to be supported on the upper mounting support part 7. The support element 4 is supported by way of a lower support element section 10 on the crash box 8. The support element 4 has an upper edge 11 which extends approximately in the vehicle longitudinal axis The type of clip connection between the two components may be seen from the further sectional views of FIGS. 4(a) and (b), which show a section through the mounting support and the support element. In FIG. 4(a), the upper edge 11 of the support element 4 may be seen, and is encompassed by a clip-like configuration. A recess 12 encompasses the entire length of the upper edge 11 of the support element 4 or even merely partial portions. The connection extends along the upper edge 11 of the support element 4. In FIG. 4(b), it may be seen that the mounting support 3 on its lower face terminates in a bearing lug 13 configured in the vehicle transverse direction. The support element 4 has, on the other hand, a clip hook 14 along the upper edge 11, said clip hook 14 extending along the edge in the z-direction.

When mounting the support element 4 in the lower face of the mounting support 3, the support element 4 is inserted approximately in the y-direction as far as the clip connection and latched therein. Subsequently, the mounting support 3 may be connected to the crash box or the longitudinal member via the connections of the support element 4 which may have different configurations. By the use of clip connections the front-end module may be constructed with variants. In this case, different support elements 4 having different overall heights are clipped to the mounting support 3.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Front-end module
2 Cross-member
3 Mounting support
4 Support element
5 Lock support
6 Upper flange
7 Upper part
8 Crash box
9 Upper support
10 Lower/Crash box support
11 Upper edge
12 Clips
13 Bearing lug
14 Clip hook

What is claimed is:

1. A front-end module for a vehicle, comprising:
a cross-member with crash boxes attached thereto;
a mounting support arranged spaced apart therefrom and above said cross-member, the mounting support having an upper mounting support part;
support elements to attach the mounting support to the cross-member or the crash boxes, wherein the support elements have different overall heights, the support elements having a lower support element section to support the support element on a corresponding crash box, and an upper support element section having an upper edge thereof which is received by the upper mounting support part to attach the mounting support to the cross-member.

2. The front-end module of claim 1, wherein the mounting support comprises an upper mounting support flange.

3. The front-end module of claim 2, wherein the upper mounting support flange comprises a metal.

4. The front-end module of claim 2, wherein the upper mounting support part comprises a plastic.

5. The front-end module of claim 2, wherein the upper mounting support part comprises a bearing lug to receive the upper edge of the support element.

6. The front-end module of claim 2, wherein the support element is to be latched to the upper mounting support part in the y-direction of the vehicle longitudinal axis.

7. The front-end module of claim 2, wherein the support element and the upper mounting support part are latched to each other in the vehicle transverse direction.

8. The front-end module of claim 1, wherein the mounting support is composed entirely of a plastic.

9. The front-end module of claim 1, wherein the mounting support is composed entirely of an assembly of an organometallic sheet with metal.

10. The front-end module of claim 1, wherein the mounting support is composed entirely of an assembly of an organometallic sheet with lightweight metal.

11. A front-end module for a vehicle, comprising:
a cross-member having crash boxes;
a mounting support arranged spaced apart therefrom and above said cross-member, the mounting support including a mounting support body, an upper mounting support part having a recess, and an upper mounting support flange; and
support elements to attach the mounting support to the crash boxes, wherein the support elements are latched to the upper mounting support part, and includes an upper support element section which is supported on the upper mounting support part and which has an upper edge that is received by the recess of the upper mounting support to latch the support elements to the upper mounting support part, and a lower support element section which is supported on a corresponding one of the crash boxes.

12. The front-end module of claim 11, wherein the recess receives and encompasses an entire length of the upper edge of the support element.

13. The front-end module of claim 11, wherein the the support element comprises a clip hook on the upper edge thereof that engages a bearing lug which terminates at a lower face of the upper mounting support part in a transverse direction of the vehicle.

14. The front-end module of claim 11, wherein the upper mounting support flange comprises a metal.

15. The front-end module of claim 11, wherein the upper mounting support part comprises a plastic.

16. The front-end module of claim 11, wherein the mounting support is composed entirely of a plastic.

17. The front-end module of claim 11, wherein the mounting support is composed entirely of an assembly of an organometallic sheet with metal.

18. A front-end module for a vehicle, comprising:
a cross-member having crash boxes;
a mounting support arranged above said cross-member, the mounting support on a lower face thereof terminating into a bearing lug;
support elements, each support element having a lower support element section to support the support element on a corresponding crash box, and an upper support element section having a clip hook received by the bearing lug to attach the mounting support to the cross-member.

* * * * *